(12) United States Patent
Kumar et al.

(10) Patent No.: US 10,210,052 B1
(45) Date of Patent: Feb. 19, 2019

(54) LOGLESS BACKUP OF DATABASES USING INTERNET SCSI PROTOCOL

(71) Applicant: EMC Corporation, Hopkinton, MA (US)

(72) Inventors: Kiran Mv Kumar, Bangalore (IN); Manjunath Jagannatha, Bangalore (IN); Ravi Shankar Panem, Bangalore (IN); Srikanta Kumar, Bengaluru (IN); Pradeep Anappa, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 628 days.

(21) Appl. No.: 14/923,993

(22) Filed: Oct. 27, 2015

(51) Int. Cl.
  *G06F 17/00* (2006.01)
  *G06F 11/14* (2006.01)

(52) U.S. Cl.
  CPC ...... *G06F 11/1464* (2013.01); *G06F 2201/84* (2013.01)

(58) Field of Classification Search
  CPC ............................ G06F 17/30; G06F 11/1464
  USPC .................................................. 707/600–899
  See application file for complete search history.

(56) References Cited

U.S. PATENT DOCUMENTS

2013/0036091 A1* 2/2013 Provenzano ...... G06F 17/30162
  707/624

\* cited by examiner

*Primary Examiner* — Isaac M Woo
(74) *Attorney, Agent, or Firm* — Staniford Tomita LLP (57) ABSTRACT

Embodiments provide backup up databases using a checkpoint mechanism without requiring saving of transaction logs by: taking a backup snapshot of the database; exposing an iSCSI disk using the snapshot backup as a target by encapsulating the snapshot in a virtual disk; creating a read/write differencing disk for the exposed iSCSI disk; replaying transaction logs onto the iSCSI disk; and streaming the contents of the virtual disk to a storage medium to create a saveset.

13 Claims, 5 Drawing Sheets

LOGLESS BACKUP OF DATABASES USING INTERNET SCSI PROTOCOL

CROSS-REFERENCE TO RELATED APPLICATIONS

This patent application is related to U.S. patent application Ser. No. 14/686,650 entitled "Mountable Container Backups for Files," U.S. patent application Ser. No. 14/686,668 entitled "Mountable Container for Incremental File Backups," and U.S. patent application Ser. Nos. 14/686,400; 14/686,438; and 14/686,468, all filed Apr. 14, 2015 and assigned to the assignee of the present application, which are all incorporated by reference along with all other references cited herein.

TECHNICAL FIELD

Embodiments are generally directed to database management systems, and more specifically to backing up databases using a checkpoint mechanism but without requiring transaction logs.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. Data protection and comprehensive backup and disaster recovery (DR) procedures become even more important as enterprise level networks grow and support mission critical applications and data for customers. The advent of virtualization technology has led to the increased use of virtual machines as data storage targets. Virtual machine (VM) disaster recovery systems using hypervisor platforms, such as vSphere from VMware or Hyper-V from Microsoft, among others, have been developed to provide recovery from multiple disaster scenarios including total site loss.

With regard to enterprise data stored in databases, a database engine typically performs modifications to database pages in memory (such as in a buffer cache, as opposed to writing the pages to disk after every change. The engine periodically issues a checkpoint on each database that writes the current in-memory modified pages and transaction log information from memory to disk. Database management systems thus typically follow a checkpoint mechanism wherein transaction logs are maintained that contain the history of actions executed by the database engine. This helps to guarantee ACID (atomicity, consistency, isolation, and durability) properties of database management systems to allow safe sharing of data and provide protection from crashes or hardware failures.

Transaction logs generally comprise files that list changes to the database and that are stored in a stable storage format. Any backup solution dealing with database backups would essentially need to backup both the database file and the transaction logs in order to recover it during a catastrophe. The recover process would involve recovering the database file and replaying the logs until the checkpoint is reached to get the database to a previous desired consistent state. However, this process of recovery is associated with certain challenges, such as the need to maintain multiple log files along with the database file during each backup operation, and identifying which logs to replay for a particular recovery/restore operation. This last task is generally not trivial and requires intimate knowledge of the database and its associated tools to find the correct log file set for a particular operation.

What is needed, therefore, is a database management and recovery system that eliminates the need to maintain transaction logs as part of database savesets at each level. There is a further need to reduce the amount of data stored and reduce the recovery time associated with finding and replaying the appropriate transaction logs.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems of backing up databases using a checkpoint mechanism but without requiring a transaction log ("logless" method) by utilizing the iSCSI protocol, wherein a snapshot backup of the volume containing the database (DB) is taken. This snapshot is exposed as an iSCSI disk by encapsulating the snapshot volume in a virtual disk (e.g., VHDx format). Writes on the disk are captured in a differencing disk, to the parent virtual disk encapsulating the volume snapshot. Transaction logs are replayed on the database file present in the iSCSI disk. The saveset format for these database backups is mountable container format, which is the same as the virtual disk format encapsulating the volume. The virtual disk contents along with the blocks corresponding to the database file is streamed to backup media by reading from the iSCSI virtual disk. This ensures database files backed up are always in consistent state, since the transaction logs are replayed on them during backup itself. This eliminates the need for transaction log files to be saved along with the database files as part of data protection activity. This technique can be used to backup conventional databases and applications such as Microsoft Exchange which follows a transaction log checkpoint mechanism.

Some embodiments of the invention involve database management and automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
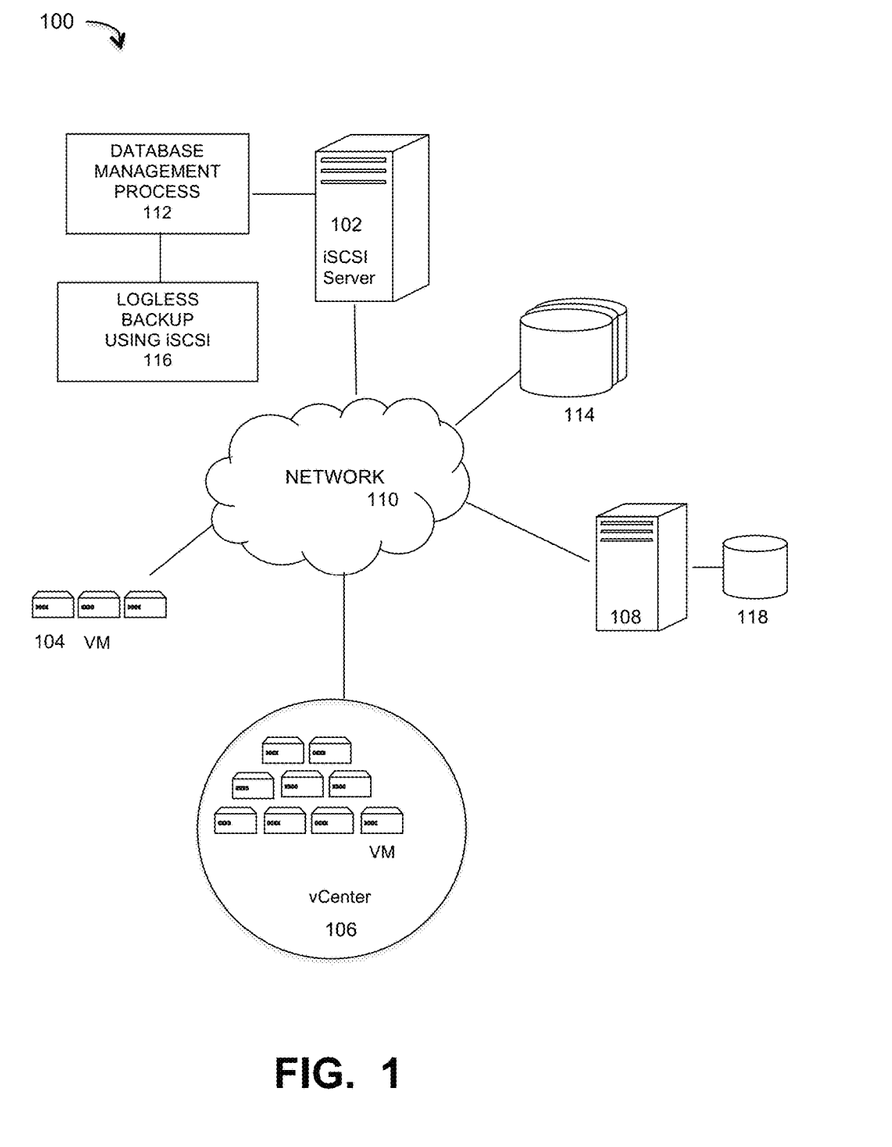
FIG. 1 is a diagram of a large-scale network implementing a logless database backup process that utilizes an Internet SCSI (iSCSI) protocol, under some embodiments.

FIG. 1 illustrates a computer network system 100 that implements one or more embodiments of a logless database backup process. In system 100, a number of VMs or groups of VMs 104 are provided to serve as backup targets. Target VMs may also be organized into one or more vCenters 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity drive (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

Figure 2:
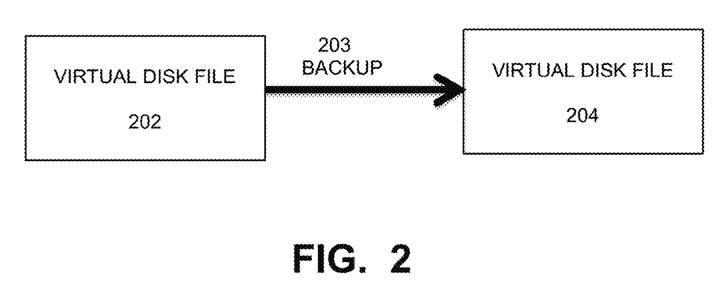
FIG. 2 illustrates an example virtual disk that may be used in a backup operation, in accordance with some embodiments.

For the embodiment of FIG. 2, network system 100 includes a server 102 that executes a database management process (DBMS) 112 with manages the data organization and backup operations for system 100 data stored in databases. The logless backup process 116 provides for the backup of database data using checkpoint mechanisms, but without requiring transaction logs to be stored and backed up with the database files.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NES (network file system) aand CIFS (common internet file system) namespaces, as well DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files. With respect to the NFS client protocol, operating systems such as Microsoft Windows may not support NFS based network file share protocol, but instead support the CIFS protocol. Since Networker supports UNIX as storage node, to interface it from Windows required interfacing with the NFS protocol. The EMC Networker platform supports an interface with NFS servers through a client library.

As is known, virtual machine environments utilize hypervisors to create and run the virtual machines. A computer unning the hypervisor is a host machine and all virtual machines are guest machines running guest operating systems (OS). The hypervisor provides the guest OSs with a virtual operating platform and manages the execution of the VMs. In an embodiment, the backup management process 112 is configured to operate with the Hyper-V hypervisor, which is a native hypervisor that creates VMs on Intel x86-64 based systems and is an integral part of the Microsoft Windows server products. In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest OSs. A parent partition creates child partitions using an API.

In an embodiment, system 100 represents a backup platform (e.g., EMC Networker) that supports block-based backups (BBB) of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created. Differencing VHDx's can be created which will have internal references to parent VHDx. In general, block based backups bypass files and file systems almost completely. The operating system file system divides the hard disk, volume or RAID array into groups of bytes called blocks (fixed size) or extents (variable size), which are typically ordered 0-N.

In a specific embodiment, the file is backed up as a virtual hard disk file that may be formatted as a VHD (Microsoft Virtual Hard Disk Image) or Microsoft VHDx file (a Microsoft Hyper-V virtual hard disk). The VHDx format is a container format which can contain disk related information. VHDx files can be mounted and used as a regular disk. Volumes such as NTFS (New Technology File System), ReFS (Resilient File System), FAT32 (32-bit File Allocation Table), or any file system, which the OS supports on the mounted disk can also be created. Differencing VHDx's can be created which will have internal references to the parent VHDx. Further discussion of the VHDx format is provided in "VHDX Format Specification," Version 0.95, Apr. 25, 2012, from Microsoft Corporation, and is incorporated by reference. The file to be backed up may be in any file format and the format may be the same as or different from the resulting backup file. For example, the file to be backed up may be formatted as a VHD/VHDx file, a Microsoft Exchange DataBase (EDB) file, a Microsoft SQL Server (MDF) file, Oracle database file (DBF), or any other file format.

FIG. 2 illustrates an example virtual disk that may be used in a backup operation, in accordance with some embodiments. As shown in FIG. 2, a volume may be configured to store information that needs to be backed up through a backup operation 203. For example, the volume may be associated with a database or repository or other data source, and may be referred to as a parent volume. In an embodiment, the backup process 112 backs up a virtual machine, which are represented as virtual disks. Thus, as shown in FIG. 2, virtual disk file 202 is backed up by operation 203 to virtual disk file 204. File 204 may be configured to store any and all back up information related to the virtual disk file 202. The file 204 may be created based on a virtual disk format and may contain information typically contained in a physical volume.

As stated above, for some embodiments, the file 204 may be created based on the Hyper-V Virtual Hard Disk (VHDX) format according to the VHDX Format Specification, published by Microsoft Corp. The file 204 may be referred to as a VHDx file and may be mounted by an operating system that supports VHDx files. One example of such an operating system is the Microsoft Windows Server 2012 by Microsoft Corp. The file 204 may be configured to store full backup information of a parent volume (e.g., volume 202). For some embodiments, the backup operation that backs up the parent volume to the file 204 may be performed using a block based backup (BBB) operation. In a block based backup, the information may be read from the parent volume block by block regardless of the number of files stored in the parent volume. The backup operation may take an image of the parent volume without having to refer to the file system associated with the parent volume.

Figure 3:
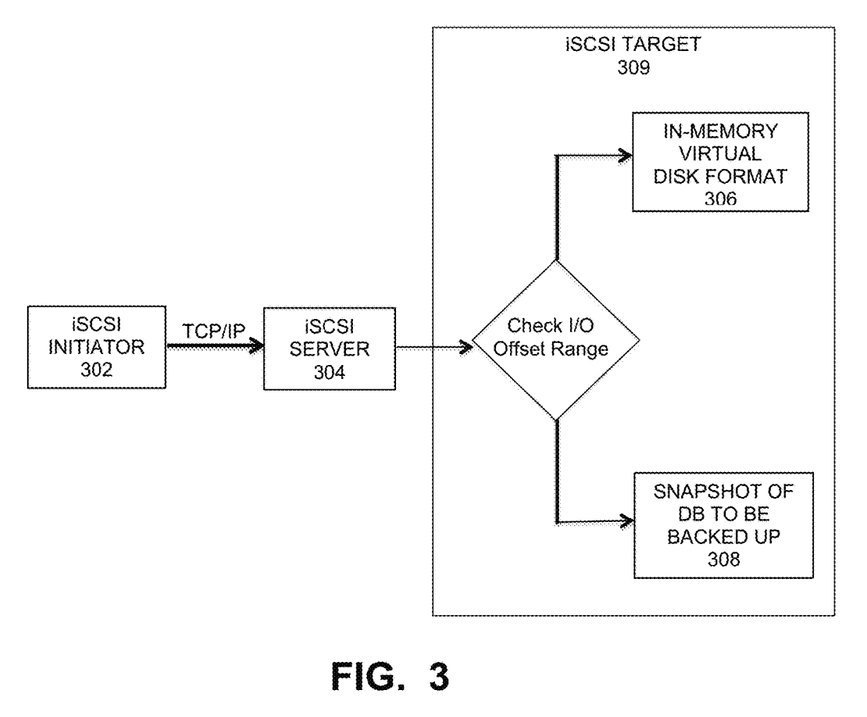
FIG. 3, which illustrates an iSCSI network for performing logless database backups under some embodiments.

As shown in FIG. 1, in an embodiment, server 102 is an iSCSI server, which uses the iSCSI protocol to serve iSCSI targets represented by virtual disk files that comprise the Hypervisor backups. In this embodiment, an iSCSI initiator provided by the operating system is used to connect to an iSCSI server capable of exposing virtual disks from the backup location. This is shown in FIG. 3, which illustrates an iSCSI network for performing logless database backups under some embodiments. The iSCSI initiator 302 communicates with iSCSI server 304 over a TCP/IP network, which in turn accesses a target 309 that manages database backup processes to generate in-memory virtual disk format 406 for backed up data and take a snapshot of the database to be backed up 408. In general, a snapshot backup is a read-only copy of the data set frozen at a particular point in time, and applications can continue to write data.

In general, the iSCSi (Internet Small Computer System Interface) allows two hosts to negotiate and then exchange SCSI commands (CDBs) using IP networks. It thus works on top of the Transport Control Protocol (TCP) and allows SCSI commands to be sent end-to-end over local-area networks (LANs), wide-area networks (WANs) or the Internet. iSCSI works by transporting block-level data between an iSCSI initiator 302 on a server 304 and an iSCSI target on a storage device, e.g., 309. The iSCSI protocol processes the SCSI commands as packetized data for the TCP/IP layer. Received packets are disassembled and the SCSI commands are separated so that the operating system sees the storage as a local SCSI device that can be formatted as usual. For server virtualization techniques that use storage pools, the storage is accessible to all the hosts within the cluster and the nodes communicate with the storage pool over the network through the use of the iSCSI protocol. The iSCSI protocol can be used to take a high-performance local storage bus and emulate it over a wide range of networks, creating a storage area network (SAN) that does not require any dedicated cabling and can be run over existing IP infrastructure.

In an embodiment, standard SCSI commands, sent in a Command Descriptor Block (CDB), are used to implement aspects of the 116 DBMS process. The CDBs can be of any appropriate size and format, for example, a CDB can be a total of 6, 10, 12, or 16 bytes, or variable-length. The CDB may consist of a one-byte operation code followed by some command-specific parameters that conform to industry standard available commands.

For the embodiment of FIG. 3, the initiator 302 functions as an iSCSI client and typically serves the same purpose to a computer as a SCSI bus adapter does by sending SCSI commands over an IP network. An initiator can be either a software initiator that uses program code to implement the iSCSI, such as through a kernel side device driver, or a hardware initiator that uses dedicated hardware to implement iSCSI. An iSCSI host bus adapter (HBA) implements a hardware initiator. An iSCSI target generally refers to a storage resource located on an iSCSI server and represents an instance of iSCSI storage nodes running on that server as a target. In a SAN, an iSCSI target is often a dedicated network-connected hard disk storage device, but may also be a general-purpose computer. For the embodiment of FIG. 1, the iSCSI targets resides in large storage arrays, such as VMs 104, vCenters 106 or RAID arrays 114. These arrays can be in the form of commodity hardware with or as commercial products such as EMCs VNX, VMAX, or other systems. A storage array usually provides distinct iSCSI targets for numerous clients.

SCSI devices are represented by individually addressable LUNs (logical unit numbers). In system 100, LUNs are essentially numbered disk drives. An initiator negotiates with a target to establish connectivity to a LUN, and the resulting iSCSI connection emulates a connection to a SCSI hard disk. Initiators treat iSCSI LUNs the same way as they would regular hard drive. Thus, rather than mounting remote directories as would be done in NFS or CIFS environments, iSCSI systems format and directly manage file systems on iSCSI LUNs. For the embodiment of FIG. 1, LUNs usually represent subsets of large RAID or VM disk arrays, often allocated one per client. Shared access to a single underlying file system is tasked to the operating system.

In an embodiment, the logless DBMS process 116 uses certain iSCSI components and workflows. One aspect consists of a iSCSI server 304 exposing a iSCSI target 309 from an in-memory virtual disk format 306, which consists of a VHDx file emulating a dummy disk with a GUID partition table (GPT) or master boot record (MBR) partition. The volume offset points to the starting offset of the snapshot. Hence, any I/O in the volume region would be done from the snapshot file 308. The virtual disk thus exposed, would be from a differencing disk to a parent disk created as explained below.

Figure 4:
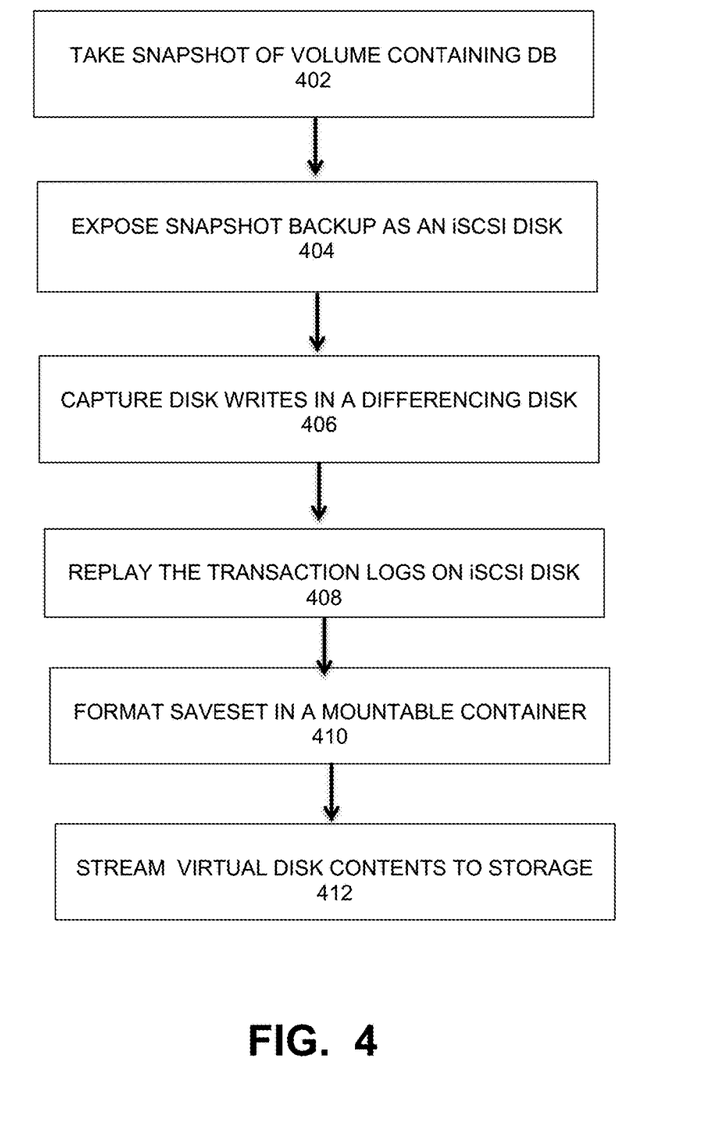
FIG. 4 is a block diagram illustrating a logless backup process under some embodiments.

In an embodiment, the log less backup process is performed as shown in the flowchart of FIG. 4. As shown in FIG. 4, the process begins with a snapshot backup of the volume containing the database, 402. This snapshot is exposed as an iSCSI disk by encapsulating the snapshot volume in a virtual disk (e.g., VHDx format), 404. Disk writes are captured in a differencing disk to the parent virtual disk encapsulating the volume snapshot, 406. Transaction logs are then replayed on the database file present in the iSCSI disk, 408. The saveset format for these database backups is in a mountable container format, which is same as the virtual disk format encapsulating the volume, 410. The virtual disk contents along with the blocks corresponding to the database file is streamed to backup media by reading from the iSCSI virtual disk 412. Embodiments of the mountable container format and the streaming process are described in co-pending U.S. patent application Ser. No. 14/686,650, which is hereby incorporated by reference in its entirety. This process ensures that the backed up database files are always in consistent state, since the logs are replayed on them during backup itself This eliminates the need for transaction log files to be saved along with the database files as part of data protection activity. This technique can be used to backup conventional databases and applications such as Microsoft Exchange, and any other similar application, which follows a transaction log checkpoint mechanism.

With respect to the embodiment for transaction logs in Microsoft Exchange, a Microsoft Exchange Server maintains data integrity by writing every transaction to a log file. The Exchange Server never commits a transaction to a database unless the transaction is complete. Before the Exchange Server can commit a transaction, it must perform a series of operations. For example, when a new message arrives, the information store must locate the rows for recipient inboxes in the folders table and locate the table that contains the target inbox data, and update both tables. If the information store cannot complete these steps (such as because a software or hardware failure occurs), it regards the transaction as incomplete and will not commit the transaction to the database. Because transaction logs are so important to the Exchange Server's data integrity, during each backup, database files (.EDB) and logs both need to be backed up to represent a consistent saveset.

Embodiments of the logless backup method can be used for full, incremental, and synthetic full database backups, among others. A full backup of a database with the logless backup technique is illustrated in FIG. 4. As stated it involves taking a snapshot of the volume containing the database, and in the example case of a Microsoft Exchange database in Windows, it includes exchange writers and take VSS snapshot of the volume containing the database. The process then exposes a iSCSI disk from the snapshot and then replaying the logs on the database present in the iSCSI disk. The contents of the virtual disk are then streamed to storage media along with the database file, which is made consistent by replaying the logs. A VSS snapshot generally comprises snapshot backups performed by the Volume Shadow Copy Service (VSS) in a Windows system. The VSS snapshots are shadow copies, and the VSS service operates at the block level of the file system and enables virtual server backup in Microsoft environments.

Figure 5:
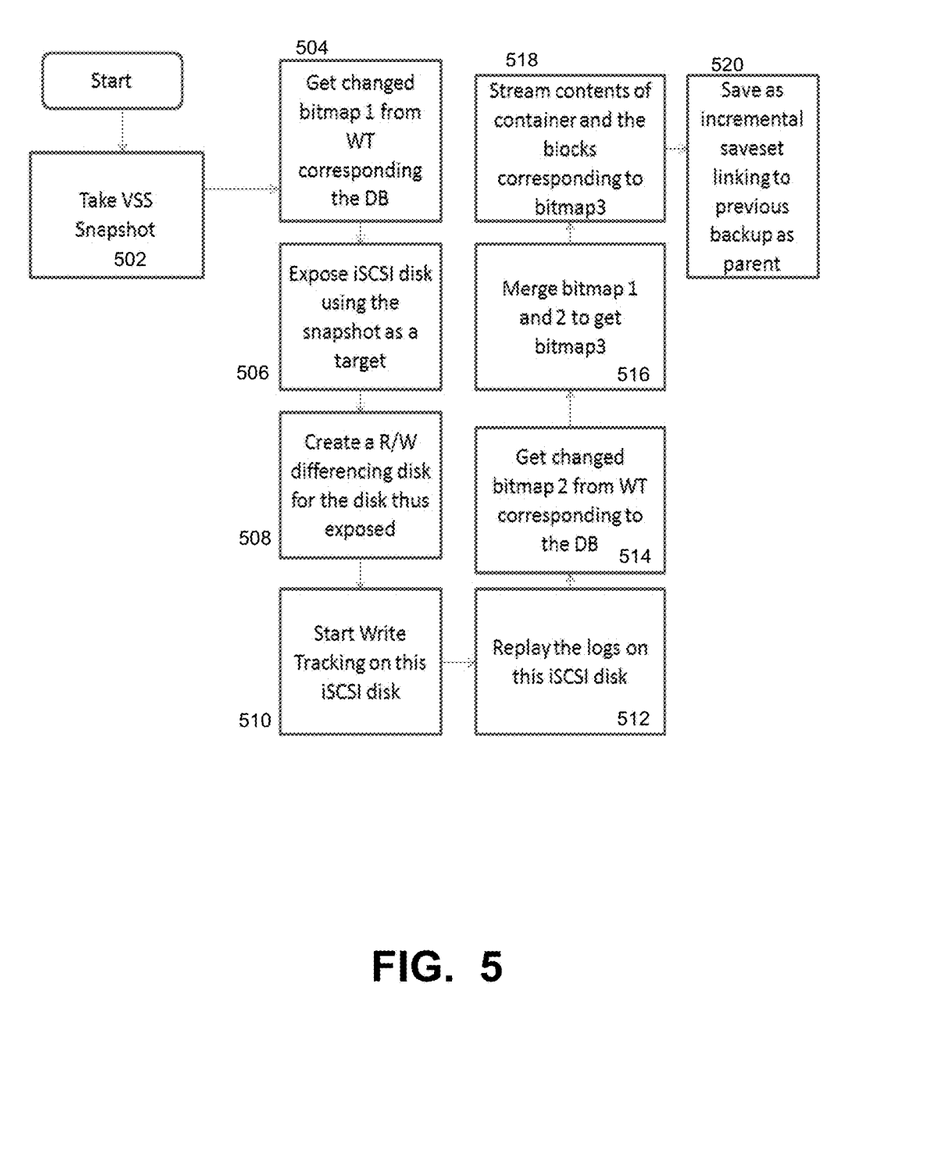
FIG. 5 illustrates a method of performing an incremental backup of databases with a logless backup process, under an embodiment.

FIG. 5 illustrates a method of performing an incremental backup of databases with a logless backup process, under an embodiment. As shown in FIG. 5, the process starts by take snapshot of the volume containing the database, such as a VSS snapshot for a Microsoft Exchange database, 502. It then gets the first bitmap (BMP1) from the write tracker (WT) identifying the changed blocks and enumerates the blocks corresponding to the database file, 504. The process then exposes a iSCSI disk from the snapshot, as described above, 506, and creates a read/write differencing disk for the exposed disk, 508. The process then starts write tracking on the exposed iSCSI disk, 510. The logs on the database present in the iSCSI disk are then replayed, 512. The process then gets the second bitmap (BMP2) from the iSCSI disk write tracker to identify the changed blocks, 514. The first and second bitmaps (BMP1 and BMP2) are then merged to create a third bitmap (BMP3), 516. The process then streams the contents of the VHDX file and the block corresponding to BMP3, 518, and save it as a differencing disk to the previous backup as the parent disk, 520.

Figure 6:
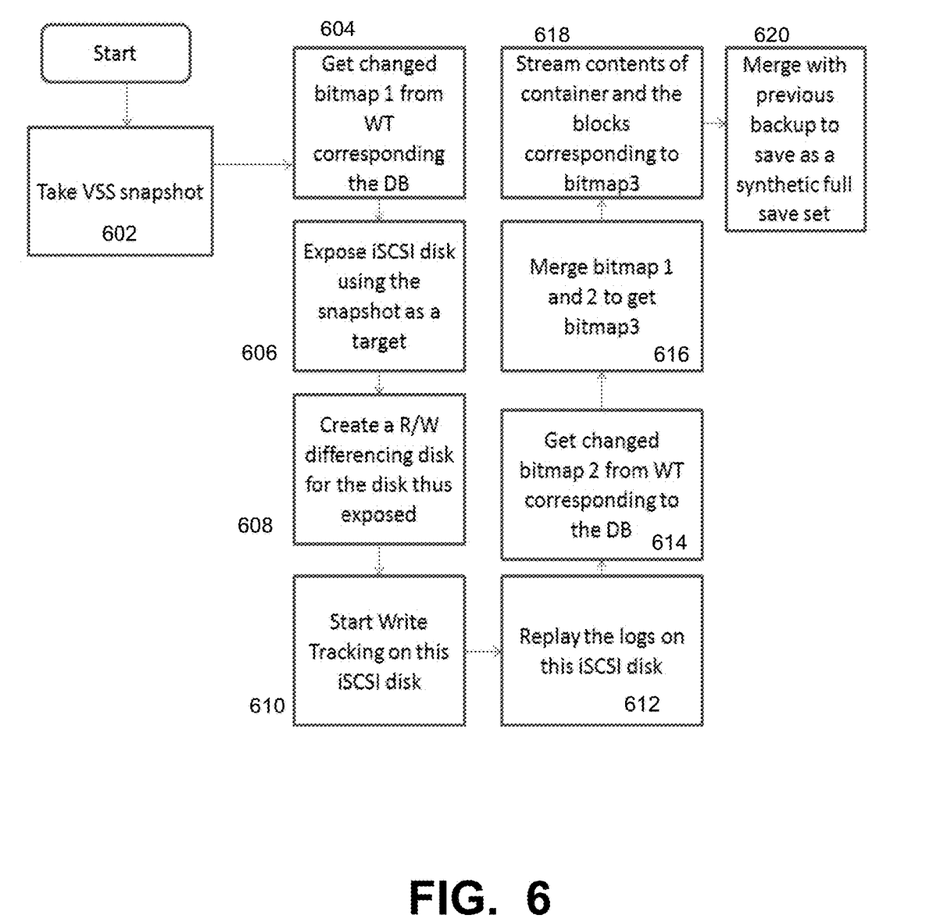
FIG. 6 illustrates a method of performing a synthetic full backup of databases with a logless backup method, under an embodiment.

FIG. 6 illustrates a method of performing a synthetic full backup of databases with a Logless backup method, under an embodiment. As shown in FIG. 6, the process begins as with the full backup case with the process taking a snapshot of the volume containing the database, 602, and getting the first bitmap (BMP1) from write tracker identifying the changed blocks, and enumerating the blocks corresponding to the database file, 604. It then exposes an iSCSI disk from the snapshot, 606, and creates a read/write differencing disk for the exposed disk, 608. The process then starts write tracking on the exposed iSCSI disk, 610, and replays the logs on the database present in the iSCSI disk, 612. The process then gets the second bitmap (BMP2) from the iSCSI disk write tracker to identify the changed blocks, 614. The BMP1 and BMP2 bitmaps are then merged to create third bitmap BMP3, 616, and the contents of the VHDX file and the block corresponding to BMP3 are streamed to storage media, 618. The process then merges the current and any previous backup or backups to create a synthesized full backup, 620.

The logless backup process for databases has certain advantages including eliminating the need to maintain transaction logs as part of savesets at each level. It also stores less data as part of the backup process and reduces recover time since there is no need to replay the transaction logs.

Although embodiments are described with respect to Microsoft Exchange systems, it should be understood that any other appropriate database server system may be used. Furthermore, although embodiments are described with respect to iSCSI systems, it should be noted that other transport protocols can also be adapted to use the recovery methods described herein, including Fibre Channel over Ethernet (FCoE), and other protocols that may implement processes like the iSCSI protocol. Likewise, although embodiments are described with respect to specific function names and code portions, it should be noted that these are provided primarily as examples and implementation within a certain versions of the UNIX or Windows operating systems, and embodiments are not so limited and cover other alternative function names, code portions, and OS implementations.

Although embodiments have been described with respect to certain file systems, such as NFS, CIFS, NTFS, and the like, it should be noted that embodiments are not so limited and other alternative file systems may also be used in conjunction with the described embodiments. Similarly different operating systems, hypervisor platforms, and data storage architectures may utilize different implementations or configurations of the described embodiments.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of backing up a database, comprising:
taking a backup snapshot of the database in a synthetic full backup operation;
exposing an iSCSI disk using the snapshot backup as a target by encapsulating the snapshot in a virtual disk;
creating a read/write differencing disk for the exposed iSCSI disk;
replaying transaction logs onto the iSCSI disk;
streaming the contents of the virtual disk to a storage medium to create a saveset having a format comprising a mountable container format that is the same as the virtual disk format encapsulating the database;
deriving a first bitmap from a write tracker corresponding to the database;
deriving a second bitmap from the write tracker corresponding to the database after replaying the transaction logs onto the iSCSI disk;
merging the first bitmap with the second bitmap to derive a third bitmap;
streaming the contents of the mountable container and blocks corresponding to the third bitmap; and
merging the streamed contents with a previous backup to generate a synthetic full saveset.

2. The method of claim 1 wherein the database is maintained in a Windows-based network, and wherein the snapshot comprises a Volume Shadow Service (VSS) snapshot.

3. The method of claim 2 wherein the virtual disk comprises a virtual machine that is formatted in a VHD, VHDx, VMDK, or appropriate virtual disk format.

4. The method of claim 2 wherein the network includes a server computer implementing a transaction log checkpoint mechanism, and wherein the transaction logs comprise lists that contain a history of actions executed by a database engine on the database.

5. The method of claim 3 wherein the virtual disk file emulates a dummy disk with a defined partition comprising one of a GUID partition table (GPT) or master boot record (MBR) partition, and wherein a volume offset points to a starting offset of the snapshot backup.

6. The method of claim 1 wherein writes on the iSCSI disk are captured on the differencing disk to a parent virtual disk encapsulating the snapshot backup.

7. The method of claim 1 wherein the backup includes an incremental backup, the method further comprising:
deriving a first bitmap from a write tracker corresponding to the database;
deriving a second bitmap from the write tracker corresponding to the database after replaying the transaction logs onto the iSCSI disk;
merging the first bitmap with the second bitmap to derive a third bitmap;
streaming the contents of the mountable container and blocks corresponding to the third bitmap; and
saving the streamed contents as an incremental saveset linking to a previous backup as a parent.

8. A system for backing up a database, comprising:
a backup component taking a backup snapshot of the database in a synthetic full backup operation;
a first component exposing an iSCSI disk using the snapshot backup as a target by encapsulating the snapshot in a virtual disk and creating a read/write differencing disk for the exposed iSCSI disk;
a second component replaying transaction logs onto the iSCSI disk;
an interface streaming the contents of the virtual disk to a storage medium to create a saveset having a format comprising a mountable container format that is the same as the virtual disk format encapsulating the database; and
a third component deriving a first bitmap from a write tracker corresponding to the database; deriving a second bitmap from the write tracker corresponding to the database after replaying the transaction logs onto the iSCSI disk; merging the first bitmap with the second bitmap to derive a third bitmap; streaming, through the interface, the contents of the mountable container and blocks corresponding to the third bitmap; and merging the streamed contents with a previous backup to generate a synthetic full saveset.

9. The system of claim 8 wherein the database is maintained in a Windows-based network, and wherein the snapshot comprises a Volume Shadow Service (VSS) snapshot, and wherein the virtual disk comprises a virtual machine that is formatted in a VHD, VHDx, VMDK, or appropriate virtual disk format.

10. The system of claim 9 wherein the network includes a server computer implementing a transaction log checkpoint mechanism, and wherein the transaction logs comprise lists that contain a history of actions executed by a database engine on the database.

11. The system of claim 10 wherein writes on the iSCSI disk are captured on the differencing disk to a parent virtual disk encapsulating the snapshot backup, and wherein the saveset format for the database backup comprises a mountable container format which is the same as the virtual disk format encapsulating the database.

12. A computer program product, comprising a non-transitory computer-readable medium having a computer-readable program code embodied therein, the computer-readable program code adapted to be executed by one or more processors to facilitate backup of a database by executing instructions implementing a method comprising:
taking a backup snapshot of the database in a synthetic full backup operation;
exposing an iSCSI disk using the snapshot backup as a target by encapsulating the snapshot in a virtual disk;
creating a read/write differencing disk for the exposed iSCSI disk;
replaying transaction logs onto the iSCSI disk; and
streaming the contents of the virtual disk to a storage medium to create a saveset having a format comprising a mountable container format that is the same as the virtual disk format encapsulating the database;
deriving a first bitmap from a write tracker corresponding to the database;
deriving a second bitmap from the write tracker corresponding to the database after replaying the transaction logs onto the iSCSI disk;
merging the first bitmap with the second bitmap to derive a third bitmap;
streaming the contents of the mountable container and blocks corresponding to the third bitmap; and
merging the streamed contents with a previous backup to generate a synthetic full saveset.

13. The computer program product of claim 12 wherein the backup includes an incremental backup, the method further comprising:

deriving a first bitmap from a write tracker corresponding to the database;
deriving a second bitmap from the write tracker corresponding to the database after replaying the transaction logs onto the iSCSI disk;
merging the first bitmap with the second bitmap to derive a third bitmap;
streaming the contents of the mountable container and blocks corresponding to the third bitmap; and
saving the streamed contents as an incremental saveset linking to a previous backup as a parent.

* * * * *